(12) United States Patent
Huang et al.

(10) Patent No.: US 8,572,625 B2
(45) Date of Patent: Oct. 29, 2013

(54) METHOD AND SYSTEM FOR APPLICATION MIGRATION USING PER-APPLICATION PERSISTENT CONFIGURATION DEPENDENCY

(75) Inventors: Hai Huang, Hawthorne, NY (US); Yaoping Ruan, Hawthorne, NY (US); Sambit Sahu, Hawthorne, NY (US); Anees A. Shaikh, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 12/535,035

(22) Filed: Aug. 4, 2009

(65) Prior Publication Data
US 2011/0035755 A1 Feb. 10, 2011

(51) Int. Cl.
*G06F 9/46* (2006.01)
*G06F 11/00* (2006.01)

(52) U.S. Cl.
USPC .......................................... 718/105; 714/100

(58) Field of Classification Search
None
See application file for complete search history.

(56) References Cited

U.S. PATENT DOCUMENTS

2008/0270515 A1* 10/2008 Chen et al. ................... 709/202

* cited by examiner

*Primary Examiner* — Jennifer To
*Assistant Examiner* — Wissam Rashid
(74) *Attorney, Agent, or Firm* — Tutunjian & Bitetto, P.C.; Louis J. Percello

(57) ABSTRACT

A system and method for determining application dependent components includes capturing interactions of an application stored in memory of a first environment with other components at runtime. The interactions are parsed and categorized to determine dependency information. The application is migrated to a new environment using the dependency information to reconfigure the application after migration without application-specific knowledge.

25 Claims, 4 Drawing Sheets

METHOD AND SYSTEM FOR APPLICATION MIGRATION USING PER-APPLICATION PERSISTENT CONFIGURATION DEPENDENCY

BACKGROUND

1. Technical Field

The present invention relates to the determination of application dependencies, and more particularly to systems and methods which determine dependent components and their relationships for a given application for migration of the application without application-specific knowledge.

2. Description of the Related Art

There are many reasons to migrate an application from one platform to another. Especially with virtualization technologies, it is common to migrate applications running on a legacy platform to a virtualization environment for better manageability. One of the challenges is to understand and reproduce dependent applications and services of a target application.

Presently, application migration maybe employed with template-based configuration analysis, which typically uses manual operations. These conventional analyses discover application-to-application data dependencies, but the user needs to have application-domain knowledge, and much of the focus is on multi-tier application dependencies. Further, the templates or configuration analysis software may not be available on a particular platform. Similarly, network packets have been employed to infer application-to-application dependencies.

Current technologies rely on application specific knowledge by building an application specific configuration file repository. Configuration file content is needed to collect the dependency information. This is cumbersome and requires time and resources since the underlying applications and platforms must be well understood.

SUMMARY

A system and method for determining application dependent components includes capturing interactions of an application stored in memory of a first environment with other components at runtime. The interactions are parsed and categorized to determine dependency information at runtime. The application is migrated to a new environment using the dependency information to reconfigure the application after migration. Prior knowledge of the application is not needed.

A method for migrating an application without application-specific knowledge, includes determining application dependent components by capturing interactions of an application stored in memory of a first environment with other components at runtime; parsing and categorizing the interactions to determine dependency information; migrating the application to a new environment; and reconfiguring the application after migration using the dependency information.

A method for migrating an application without application-specific knowledge, includes capturing system calls, including at least one of read and write system calls and networking system calls, of an application stored in memory of a first environment with other components at runtime; parsing and categorizing the system calls by applying a program, implemented in software and stored on a memory medium, to the system calls to determine dependency information of the application without application specific knowledge; and migrating the application to a new environment using the dependency information to reconfigure the application after migration for execution in the new environment. The application dependency information may include applications on different tiers of a network hierarchy or on other nodes in the network hierarchy.

A system for migrating applications includes a first computational environment and a second computational environment, each computational environment including a processing element configured to run software applications. The first computational environment includes a target application stored in memory wherein the target application is to be migrated to the second computational environment. A program, implemented in software and stored on a memory medium, is configured to determine dependencies of the target application by capturing system calls between the target application and other components at runtime without application-specific knowledge such that migrating the application to the second computational environment employs the dependencies to reconfigure the application after migration for execution in the second computational environment.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
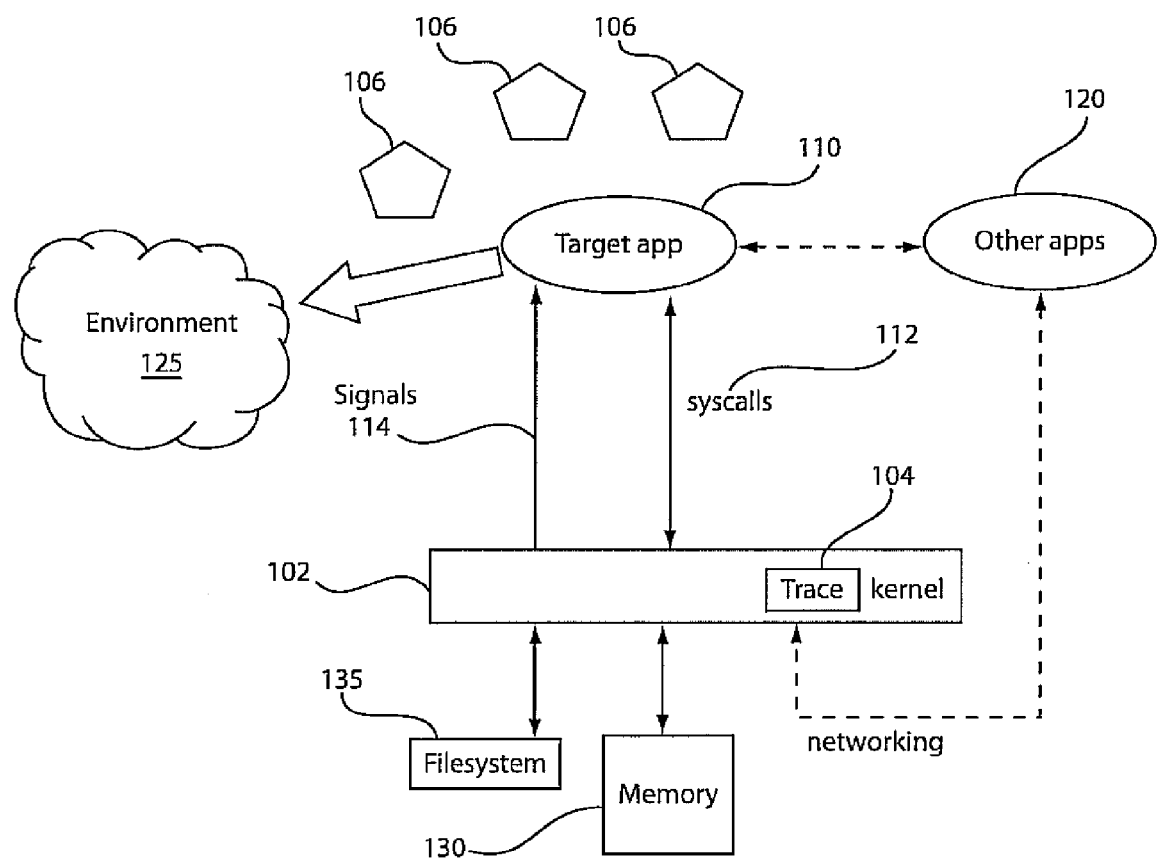
FIG. 1 is a block/flow diagram showing a system/method for migrating an application based upon derived dependency information in accordance with the present principles.

The present principles employ application runtime interaction to capture information and components needed to migrate an application and determine how to reconfigure this information and components after migration. During application runtime, the present embodiments capture interactions of an application with its surrounding component(s), including other applications, file systems, networking connections, etc. Dependency information is gathered by parsing and categorizing these interactions, which are employed for reconfiguration after the migration to ensure correctness. The present embodiments advantageously do not require application-specific knowledge, and provide a smaller set of relationships since all captured relationships are active relationships.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams provided in the FIGs. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a system/method 100 for performing application migration is illustratively shown. The present principles employ application runtime information to automatically extract data level, operating system (OS) level, and application level dependencies. The present embodiments determine dependent components and their relationship for a given application without application specific knowledge. The dependency information includes, inter alia, 1) data dependency information: e.g., configuration files, temporary directory/files, remote files; 2) OS dependency information: domain name system (DNS), network information system (NIS), network file system (NFS), virtual private network (VPN), virtual local area network (VLAN); and 3) application dependency information such as hypertext transfer protocol server, application server (e.g. WebSphere Application Server), and database (HTTP-WAS-DB), as well as other nodes.

An application migration process comprises the moving of an application between platforms or environments. One of the challenges is to understand and reproduce the dependent applications and services of the target application. For such a migration to occur, the needs or dependencies of the migrated application have to be determined and satisfied. The present embodiments automatically determine the dependencies to seamlessly enable the migration.

System 100 employs application runtime interaction to capture the interactions of the application to other components, including other applications, file systems, network connections, etc. The system 100 parses and categorizes these interactions to form dependency information. Then, the dependency information is employed to migrate the application and reconfigure the new application after migration.

A target application 110 is to be transferred or migrated to another platform or environment 125. This may include a physical relocation or may include co-location with a different configuration (e.g., new inputs and outputs). In an information collection phase, interactions with an OS kernel 102 and other applications 120 can be gathered by system call tracing tools 104 (e.g., ptrace), and parameters 106 such as application arguments, ulimit, environment variables, etc. can be gathered from a shell of the target application 110. Interactions (e.g., system calls 112 including read and writes, networking service related calls and signals 114) between the OS kernel 102, which employs a file system 135, and the target application 110 are parsed and categorized to get dependency information. The dependency information which may be stored in memory 130 is advantageously obtained during runtime using active relationships. The collection of dependency information does not require application-specific knowledge.

Figure 2:
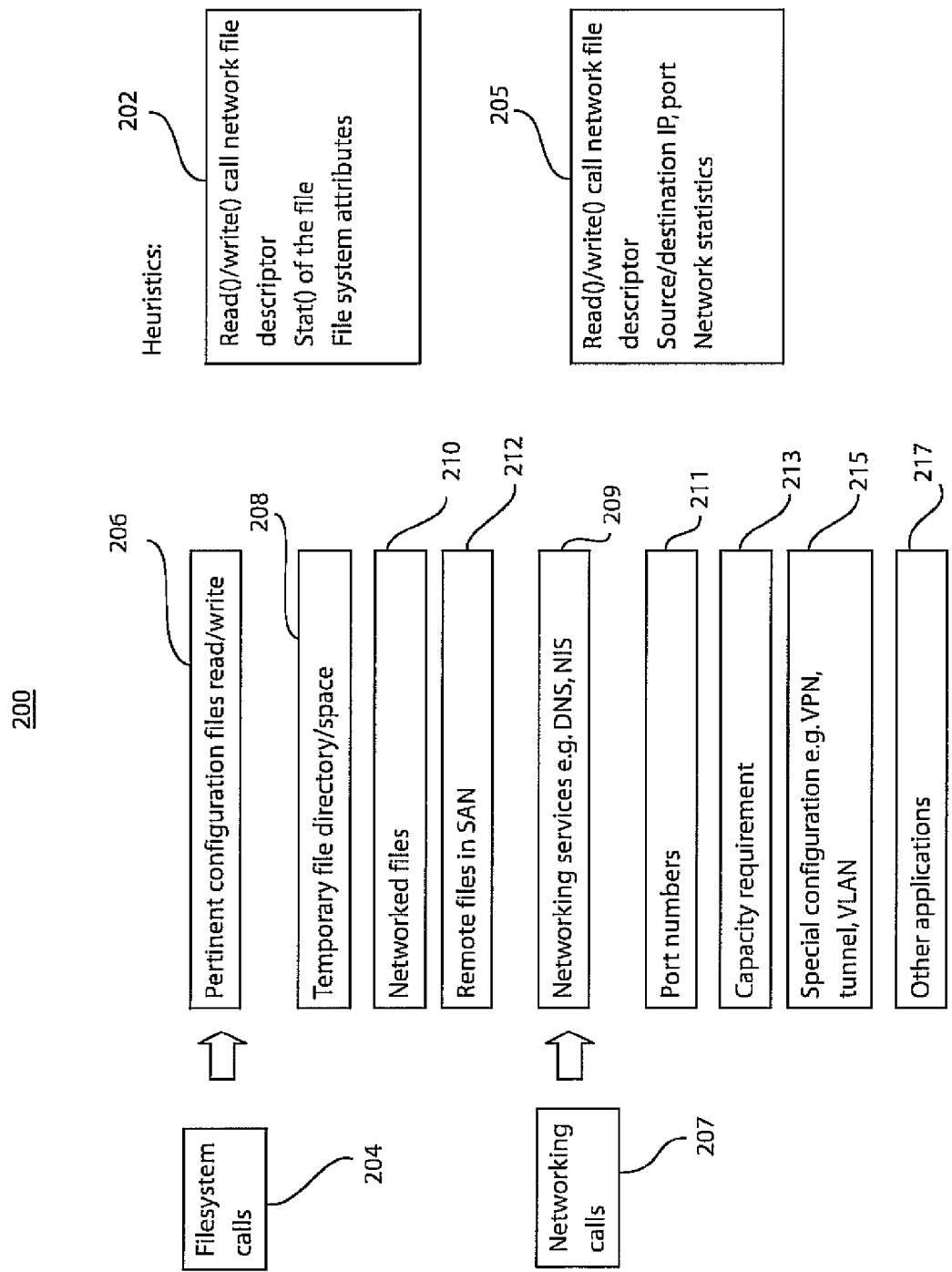
FIG. 2 is a block/flow diagram showing a system/method for parsing and categorizing derived dependency information in accordance with the present principles.

Referring to FIG. 2, a method/system 200 for determining dependent components and their relationship for a given application without application specific knowledge is illustratively shown. Dependency information includes data dependency, OS dependency, application dependency, etc. System 200 provides programs 202 and 205 for parsing and categorizing dependency information. Program 202 is provided for file system calls and interactions. Read and write operations are tracked in file system calls 204 to determine the status of a file and determine its attributes. The file system calls 204 are parsed and placed into a plurality of categories. These categories may include read/write operations from/to configuration files in block 206, temporary file directory or storage space accesses in block 208, networked files in block 210 and remote files accessed, e.g., in a storage area network (SAN) in block 212. Other operations may also be covered and included.

Program 205 is provided for parsing and categorizing networking calls and interactions for network operations or services. Read and write operations are tracked in network messages by calling network file descriptors. Networking calls 207 are parsed and categorized to determine the source/destination addresses and provide network statistics. The categories of networking calls 207 may include networking services information (e.g., DNS, NIS, etc.) in block 209, port numbers in block 211, capacity requirements or information in block 213, special configuration information (e.g., VPN, tunnels, VLAN, etc.) in block 215 or other applications in block 217. Other operations may also be covered and included.

Programs 202 and 205 categorize the dependent components into configuration files and dependent resources. In one embodiment, files in blocks 206, 210, and/or 212 are categorized as configuration files. Other components, such as in blocks 208, 209, 211, 213, 215 and/or 217 are categorized as dependent resources. In one embodiment of migration and reconfiguration, configuration files can be applied to a new environment directly. Dependent resources are used to check the correctness in the new environment. Configuration of the dependent resources may employ known methods such as configuring networked files, etc.

A method to derive key dependencies may include the following program flow:

| Program Flow A: |
|---|
| 1 FOR every read( ) system call |
| 2   get file descriptor |
| 3   IF file descriptor is a file |
| 4     get file path |
| 5     get file metadata |
| 6     IF file not generated by the application automatically |
| 7       record file name in configuration set |
| 8     ELSE IF file generated by the application during runtime |
| 9       record file directory as a temporary space set |
| 10    ELSE IF file remotely mounted |
| 11      record as a networked file |
| 12      find the remote mount point of the file system |
| 13    END IF |
| 14 END IF |
| 15 FOR every write( ) system call |
| 16   get file descriptor |
| 17   IF file descriptor is a networking descriptor |
| 18     get destination IP, port |
|     record destination IP and port as application dependency |
| 20 FOR networking service related calls such as hostname( ) etc. |
| 21   get the service name |
| 22   record in service dependency set |

Figure 3:
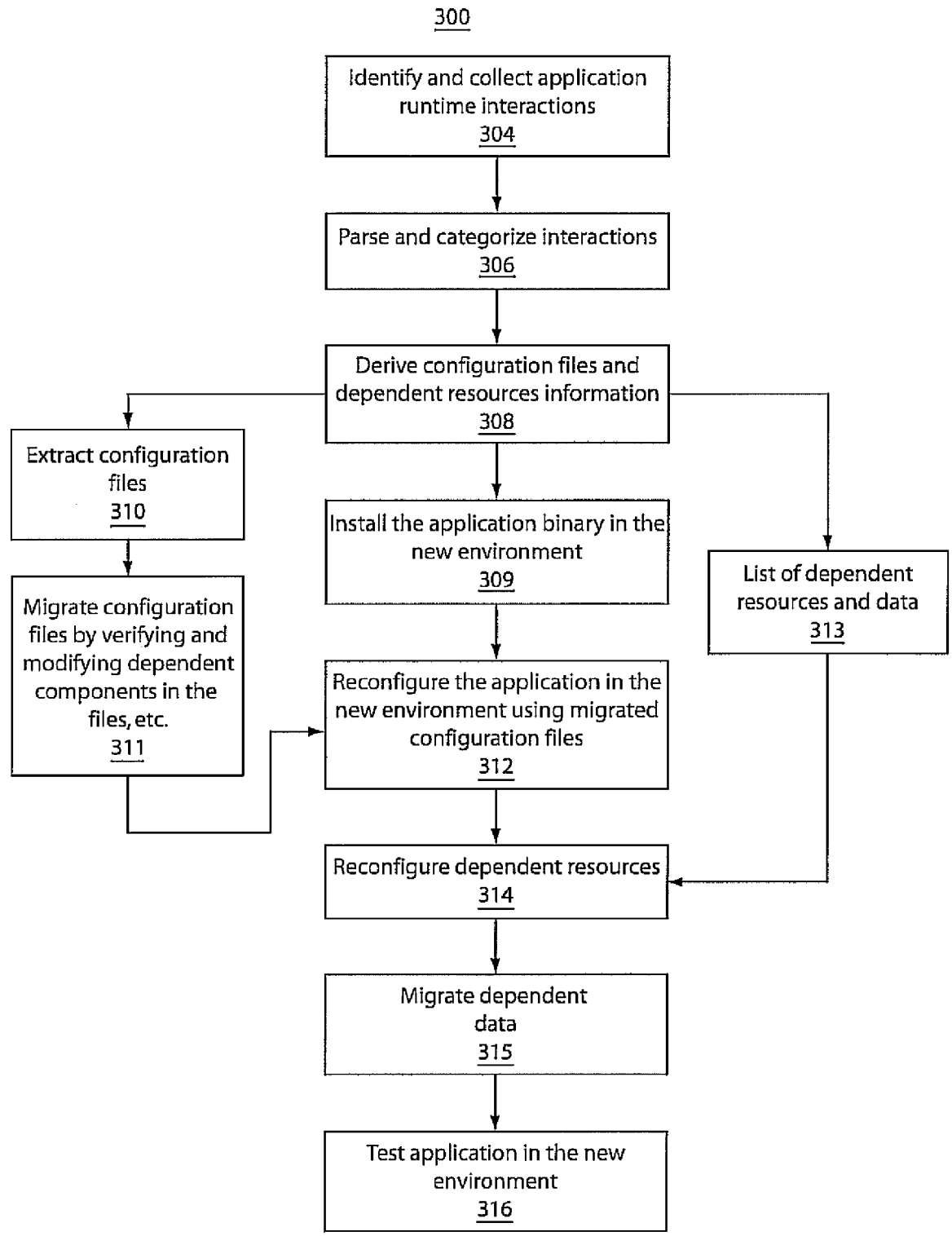
FIG. 3 is a block/flow diagram showing a system/method for deriving dependency information in accordance with the present principles.

Referring to FIG. 3, a method/system 300 determines application dependent components using application runtime information, where data dependencies may include configuration files, temporary directory and files, remote files, OS dependency may include DNS, NIS, NFS, VPN, VLAN, and application dependency may include applications on other tiers or on other nodes.

In block 304, application runtime interactions are identified and collected. The application runtime interactions are captured for the application between other components including other applications, file systems, network connections, etc. In block 306, the interactions are parsed to determine the dependency information and categorized into different categories to organize and identify the dependency information. In block 308, configuration files and dependent resource information are derived. The derived configuration files can be extracted in block 310 and employed in migration of an application by updating dependent components in block 311. In one embodiment, examples of configuration files may include httpd.conf for an Apache HTTPD server, server.xml for a WebSphere Application server, or other files. Dependent components which are specified in these configuration files such as, e.g., IP addresses, hostnames, and file paths are replaced with a target environment setup to provide migration of the application.

In block 313, a dependent resource list is generated from the dependent resource information and dependent data information derived in block 308. In one embodiment, the dependent resources include but are not limited to: an NFS setup and exported path, a SAN setup and mounted path, a DNS setup, an NIS setup and user name, a privilege configuration, network port(s) availability, a network bandwidth requirement, a VPN, a VLAN setup, and other applications which the target application relies on. In block 309, the application (e.g., the binary code) is installed in a new environment. In block 312, the application is reconfigured in the new environment using the migrated configuration files from block 311. In block 314, the dependent resources as provided from the list in block 313 are reconfigured in the new environment. In block 315, any dependent data is also migrated into the new environment. It should be understood that the new environment may be located on a same or different machine, node or location.

The new application is now configured for the new environment and should be capable of execution in the new environment with the same capabilities as in the original environment. Initial testing may be performed to ensure that the application is running correctly in the new environment in block 316. The migration process includes adapting aspects of the application in accordance with the dependency information. For example, the dependency information may indicate that specific types of data fields are needed as input or the application needs access to particular services located at specific addresses that need to be updated in the new environment, etc.

In one embodiment, the operability of the migrated application may be tested in the new environment. For example, in one approach, a migration tool/program is employed in a controlled test environment. First, the application is checked for any instrumentation (e.g., kernel modules, virtual device drivers, etc.). A test suite may be employed to test various types of persistent configuration dependencies and determine whether the tool is able to report the dependencies. The test suite may also be configured to determine whether the migrated application works in a satisfactory way in the new environment.

Figure 4:
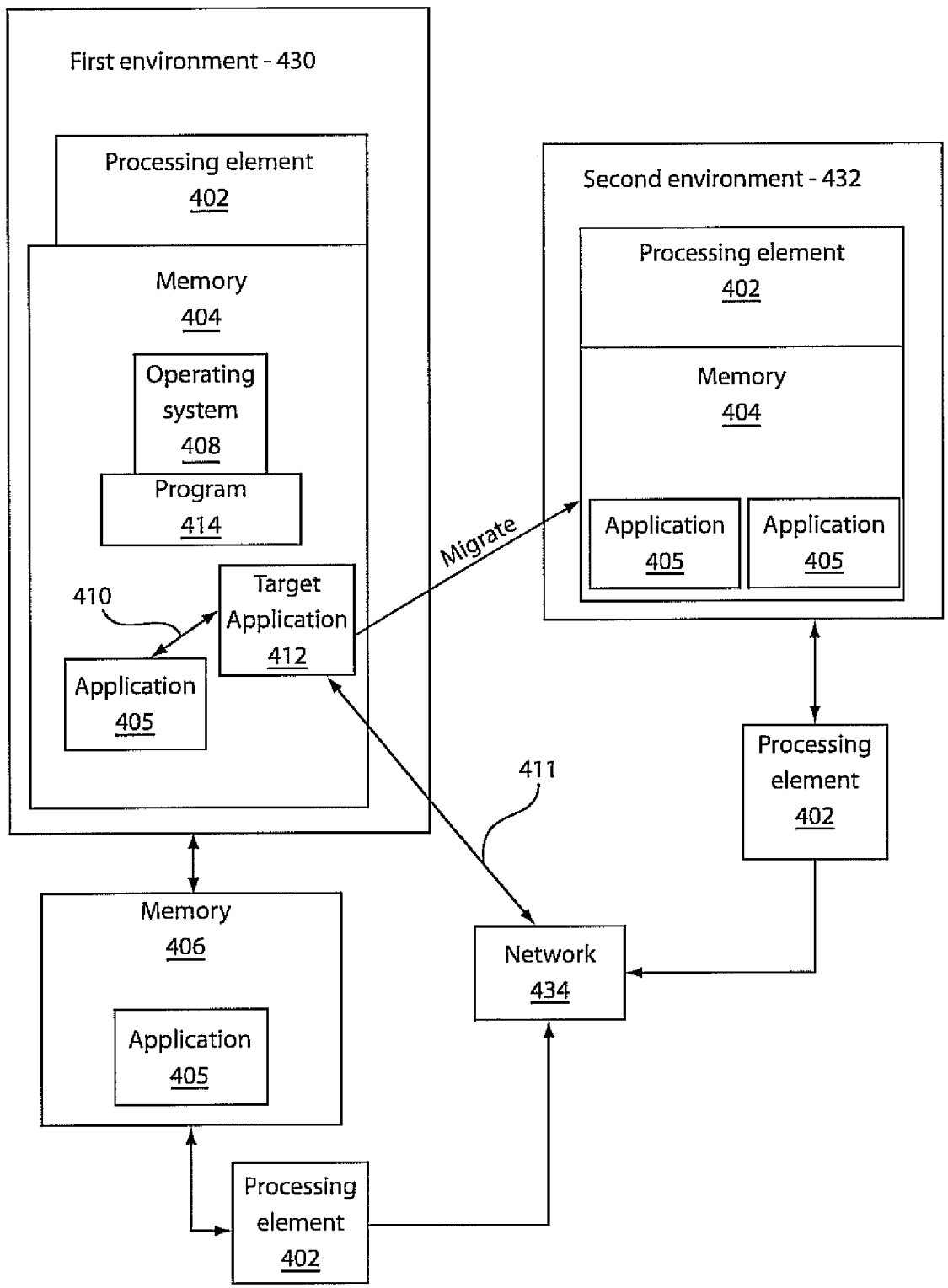
FIG. 4 is a block diagram showing a system for migrating an application based upon derived dependency information in accordance with the present principles.

Referring to FIG. 4, a system 400 is illustratively shown which permits application migration in accordance with the present principles. System 400 includes one or more processing elements 402, which may include processors, servers, processing nodes, individual devices, such as cell phones, personal digital assistances, lap top computers or any other computing device. Each processing element 402 may include associated memory 404 and/or a memory 406 employed by the one or more processing elements 402. The processing elements 402 may be networked together in a network 434. The network 434 may include a local network, global network or any other network. Memory 404 and/or memory 406 may store one or more applications 405. The processing elements (e.g., nodes) 402 may include an operating system 408 which handles system calls 410 and network calls 411 to and from a target application 412 to other components or services. The operating system 408 is configured to run a program 414 (such as, e.g., Program Flow A, described above) to determine the dependencies needed to migrate a program to a new environment 432 from a first or original environment 430 without needing application-specific knowledge of the target application 412. Upon migrating the application to the new environment 432, the application 412 can be reconfigured automatically in the new environment 432 based on the dependencies discovered by Program Flow A. This may include translating parameters, commands, user information, etc. The migrated application is now fully functional in the new environment 432.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for migrating an application without application-specific knowledge, comprising:
   determining components that the application depends on by capturing interactions of system calls of the application stored in memory of a first environment with other components at runtime, wherein the interactions include at least one of read and write system calls and networking system calls;
   parsing and categorizing the interactions of the system calls to determine dependency information of the application without application specific knowledge, wherein the dependency information includes dependent components in one or more configuration file for the application and a list of dependent resources that the application uses;
   migrating the application to a new environment; and
   reconfiguring the application after migration using the dependency information by verifying and modifying dependent components in one or more configuration file for the application to configure the application for the new environment; and
   reconfiguring dependent resources from the list of dependent resources to configure the new environment for the application.

2. The method as recited in claim 1, wherein the other components include at least one of other applications, file systems, and network connections.

3. The method as recited in claim 1, wherein the interactions include active relationships and the method includes migrating the application with the migration configuration file and a list of dependent resources and is configured for execution in the new application without application-specific knowledge.

4. The method as recited in claim 1, wherein the dependency information includes at least one of data dependency, operating system (OS) dependency, and application dependency.

5. The method as recited in claim 4, wherein the dependency information includes temporary directory and files, and remote files.

6. The method as recited in claim 4, wherein the operating system's OS dependency information includes one of domain name system (DNS), network information system (NIS), network file system (NFS), virtual private network (VPN), virtual local area network (VLAN).

7. The method as recited in claim 4, wherein the dependency information includes applications on different tiers of a network hierarchy or on other nodes in the network hierarchy.

8. The method as recited in claim 1, wherein capturing interactions includes monitoring read and write system calls.

9. The method as recited in claim 1, wherein capturing interactions includes monitoring networking system calls.

10. The method as recited in claim 1, wherein reconfiguring includes adapting the application for the new environment based on a dependent resource list and a migration configuration file.

11. A method for migrating an application without application-specific knowledge, comprising:
    capturing system calls, wherein the system calls are interactions that include at least one of read and write system calls and networking system calls of the application stored in memory of a first environment with other components at runtime;
    parsing and categorizing interactions of the system calls by applying a program, implemented in software and stored on a memory to determine dependency information of the application without application specific knowledge, wherein the dependency information includes dependent components in one or more configuration file for the application and a list of dependent resources that the application uses; and migrating the application to a new environment using the dependency information to reconfigure the application after migration for execution in the new environment by:
verifying and modifying dependent components in one or more configuration file for the application to configure the application for the new environment; and
reconfiguring dependent resources from the list of dependent resources to configure the new environment for the application.

12. The method as recited in claim 11, wherein the other components include at least one of other applications, file systems, and network connections.

13. The method as recited in claim 11, wherein the dependency information includes at least one of data dependency, operating system (OS) dependency, and application dependency.

14. The method as recited in claim 13, wherein the dependency information includes temporary directory and files, and remote files.

15. The method as recited in claim 13, wherein the operating system's OS dependency information includes one of domain name system (DNS), network information system (NIS), network file system (NFS), virtual private network (VPN), virtual local area network (VLAN).

16. The method as recited in claim 13, wherein the dependency information includes applications on different tiers of a network hierarchy or on other nodes in the network hierarchy.

17. A non-transitory computer readable storage medium comprising a computer readable program for migrating an application without application-specific knowledge, wherein the computer readable program when executed on a computer causes the computer to perform the steps of:
determining components that the application depends on by capturing interactions of system calls of the application stored in memory of a first environment with other components at runtime, wherein the interactions include at least one of read and write system calls and networking system calls,
parsing and categorizing the interactions of the system calls to determine dependency information of the application without application specific knowledge, wherein the dependency information includes dependent components in one or more configuration file for the application and a list of dependent resources that the application uses;
migrating the application to a new environment using the dependency information; and
reconfiguring the application after migration without application-specific knowledge by verifying and modifying dependent components in one or more configuration file for the application to configure the application for the new environment; and
reconfiguring dependent resources from the list of dependent resources to configure the new environment for the application.

18. The computer readable medium as recited in claim 17, wherein the interactions include active relationships and migrating the application includes migrating the application with a migration configuration file and a list of dependent resources and configured for execution in the new application without application-specific knowledge.

19. The computer readable medium as recited in claim 17, wherein reconfiguring includes adapting the application for the new environment based on a dependent resource list and a migration configuration file.

20. The computer readable medium as recited in claim 17, wherein capturing interactions includes monitoring at least one of read and write system calls and networking system calls.

21. A system for migrating applications, comprising:
a first computational environment and a second computational environment, each computational environment including a processing element configured to run software applications;
the first computational environment including a target application stored in memory wherein the target application is to be migrated to the second computational environment; and
a program, implemented in software and stored on a memory medium, being configured to determine dependencies of the target application, including dependent components in one or more configuration file for the application and a list of dependent resources that the application uses, by capturing interactions of system calls between the target application and other components at runtime without application-specific knowledge such that migrating the application to the second computational environment employs the dependencies to reconfigure the application after migration for execution in the second computational environment by verifying and modifying dependent components in one or more configuration file for the application to configure the application for the new environment and reconfiguring dependent resources from the list of dependent resources to configure the new environment for the application.

22. The system as recited in claim 21, wherein the one of the first and second computational environments includes a network.

23. The system as recited in claim 22, wherein the first computational environment includes a first node in the network and the second computational environment includes a second node in the network.

24. The system as recited in claim 21, wherein the one of the first and second computational environments includes a handheld device.

25. The system as recited in claim 21, wherein the system calls include read and write system calls and networking system calls.

* * * * *